Dec. 6, 1966   H. K. NAUMANN   3,289,858
ARTICLE TRANSFER APPARATUS
Filed Feb. 9, 1965   6 Sheets-Sheet 1

INVENTOR
H.K. NAUMANN
By J.L. Landis
ATTORNEY

United States Patent Office 3,289,858
Patented Dec. 6, 1966

3,289,858
ARTICLE TRANSFER APPARATUS
Harry K. Naumann, Wernersville, Pa., assignor to Western Electric Company Incorporated, New York, N.Y., a corporation of New York
Filed Feb. 9, 1965, Ser. No. 431,363
8 Claims. (Cl. 214—1)

This invention relates to apparatus for transferring articles from one work holder to another. More particularly, the invention relates to apparatus for orienting a component having a tab and then inverting the component to remove it from a first work holder and move it laterally and downwardly to position the component in an oriented manner in a nest of a second work holder.

In the manufacture of small electrical components having depending leads and a projecting tab, it is necessary to perform operations on the components while the components are oriented in different positions. It has been found that it is convenient to perform operations on the components as they are fed along a vibratory track with the leads depending downwardly and the tab projecting forwardly. It has also been found convenient to perform other operations on the components while the components are positioned in an inverted manner in nests of an indexable work holder. In the past the transfer has either been accomplished by a plurality of devices for performing the functions of orienting, locking and inverting, or the transfer has been done manually. The instant machine avoids many of such separate devices and intermediate manual steps and provides a completely automatic apparatus for orienting and then inverting the components to transfer the components from the first work holder to an intermediate holder and then to the second work holder.

It is an object of the present invention to provide new and improved apparatus for transferring articles from one work holder to another.

It is another object of the invention to provide apparatus which orients an article positioned on a first work holder and then inverts the article and positions it in a second work holder.

It is still another object of the invention to provide new and improved apparatus for removing an electrical component from the first work holder and inverting and moving the component to position the component in the second work holder positioned below and laterally displaced from the first work holder.

It is a further object of the invention to transfer an article from a first work holder to an intermediate holder in an inverted position, and then move the article laterally and downwardly into a second work holder.

Another object is to provide continuous automatic equipment of a relatively simple nature for transferring a succession of articles from one work holder to another in the indicated manner.

With these and other objects in mind, an apparatus in accordance with the invention includes a pair of opposed jaws for orienting and gripping an electrical component in a predetermined manner and then inverting the component to transfer the component to a vacuum holder, which is then moved laterally and downwardly to position the component in an oriented manner in a nest of the second work holder.

More specifically, the invention contemplates an apparatus for orienting and transferring electrical components having an extending tab from a vibratory track to a indexable work holder having nests for receiving the components, the holder being positioned below and laterally displaced from the track. A pair of arms having opposed jaws and depending guides is provided for gripping and orienting a component with the tab extending parallel to the path of advancement. A driving mechanism is provided for rotating the arms to invert the oriented component and position the component in a groove of a vacuum holder. Facilities then open the jaws and move the vacuum holder laterally and downwardly to position the inverted component in a nest of the indexable work holder. The arms are then rotated in a reverse manner to their original orienting and gripping position while the vacuum holder is retracted to its original position and the work holder is indexed to advance another empty nest.

Other objects, advantages and aspects of the invention will become apparent by reference to the following detailed specification and drawings of a specific embodiment thereof, wherein.

General arrangement

Figures 1, 3:
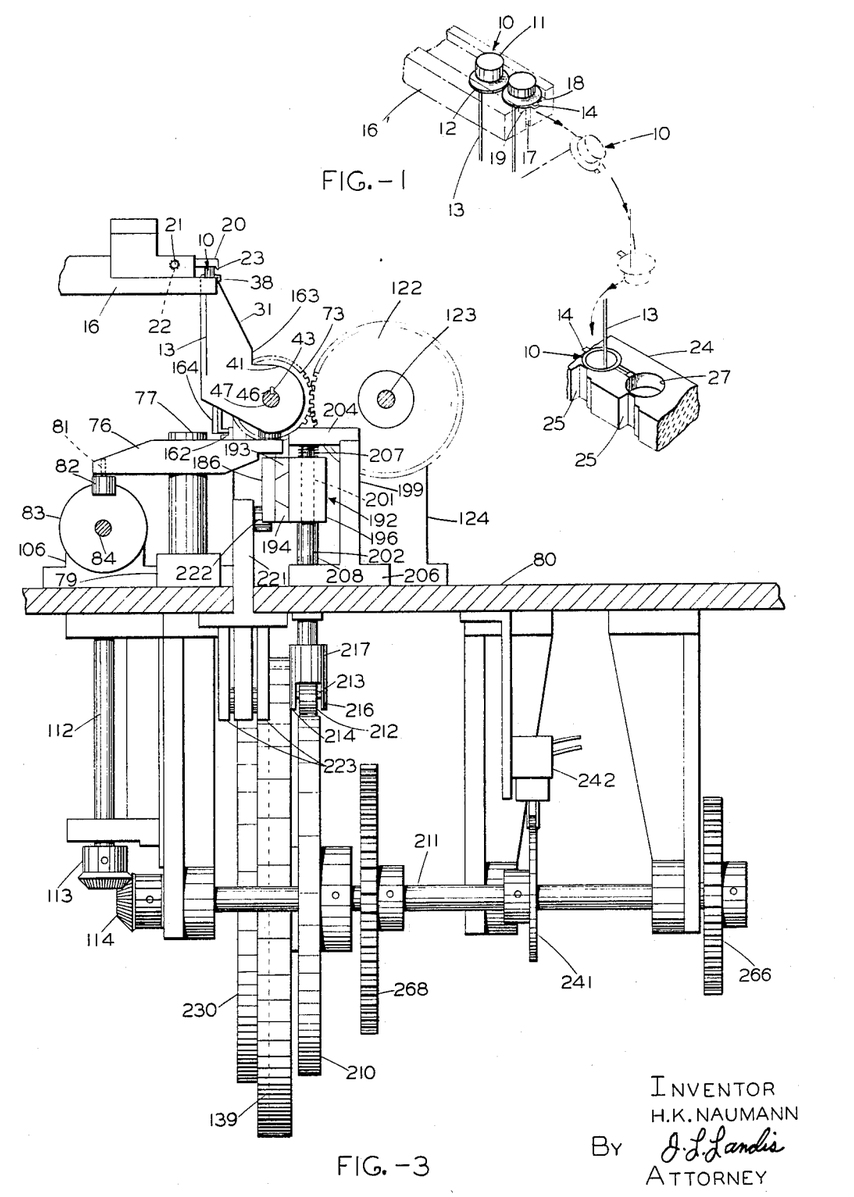
FIG. 1 is a perspective view of a vibratory feed track having electrical components positioned thereon and showing the path of travel of the components in phantom lines as they are inverted and moved laterally and downwardly and positioned in a nest of a work holder.
FIG. 3 is a cross-sectional view taken along line 3—3 of FIG. 2 and showing a jaw in position to receive a component from the vibratory track.

Referring to the drawings and, more particularly, FIG. 1, there is shown an electrical component 10 which is typical of articles which may be processed by the transfer apparatus of the invention. In this example, the component 10 is a transistor header of conventional design having a cylindrical head 11 and an enlarged, circular flange 12 at the base of the head. At least one lead 13 depends from the head 11, and a locating tab 14 extends in a lateral direction from the flange 12 to provide for precise orientation of the component during manufacture and subsequently. A vibratory track 16 of generally conventional design is provided to support and feed a continuous supply of the components 10 from a previous manufacturing operation to a point where the components are picked up by the transfer apparatus of this invention. In the previous operation, it was necessary to work on the component with the lead 13 "down"; whereas, in the next step, the component must be inverted for processing with the lead "up."

The track 16 includes a groove 17 through which the lead 13 extends. The groove 17 also serves to orient the component 10 so that the tab projects in a generally "forward" direction, by which is meant the direction of movement of the components along the track 16, indicated by the arrows. The groove 17 is defined by a pair of ledges 18 and 19 which support the flange 12 of a component 10. A pivotable detent 20 (FIG. 3) is mounted on a pin 21 and is urged in a downward direction by a spring 22 so that a tip 23 of the detent 20 normally retains the foremost component 10 on the track 16.

Mounted beneath the track 16 and laterally displaced therefrom is an indexable jig, track or rack 24 having recesses 25 formed in the side for the reception of a rack-locating pin 26 (FIG. 2) which is slidable into engagement and out of engagement with the rack 24 by conventional drive facilities (not shown). The rack 24 also has apertures or nests 27 which conform generally to the shape of the heads 11 of the components 10 to receive the components with the lead 13 "up" as illustrated in FIG. 1.

The apparatus comprising the illustrative embodiment of the invention is designed to orient the components 10 in the track 16, remove the components therefrom, invert them and move them laterally and downwardly into the nest 27, generally as indicated by the phantom arrows in FIG. 1. The foregoing operations are accomplished continuously and automatically in timed relationship with the movement of the rack 24. Of course, it is to be understood that the specific work holders and electrical component illustrated are only examples of the use of the invention, and that other articles may be oriented and transferred from other types of work holders in accordance with the principles of the invention.

*Orienting and gripping*

Figure 2:
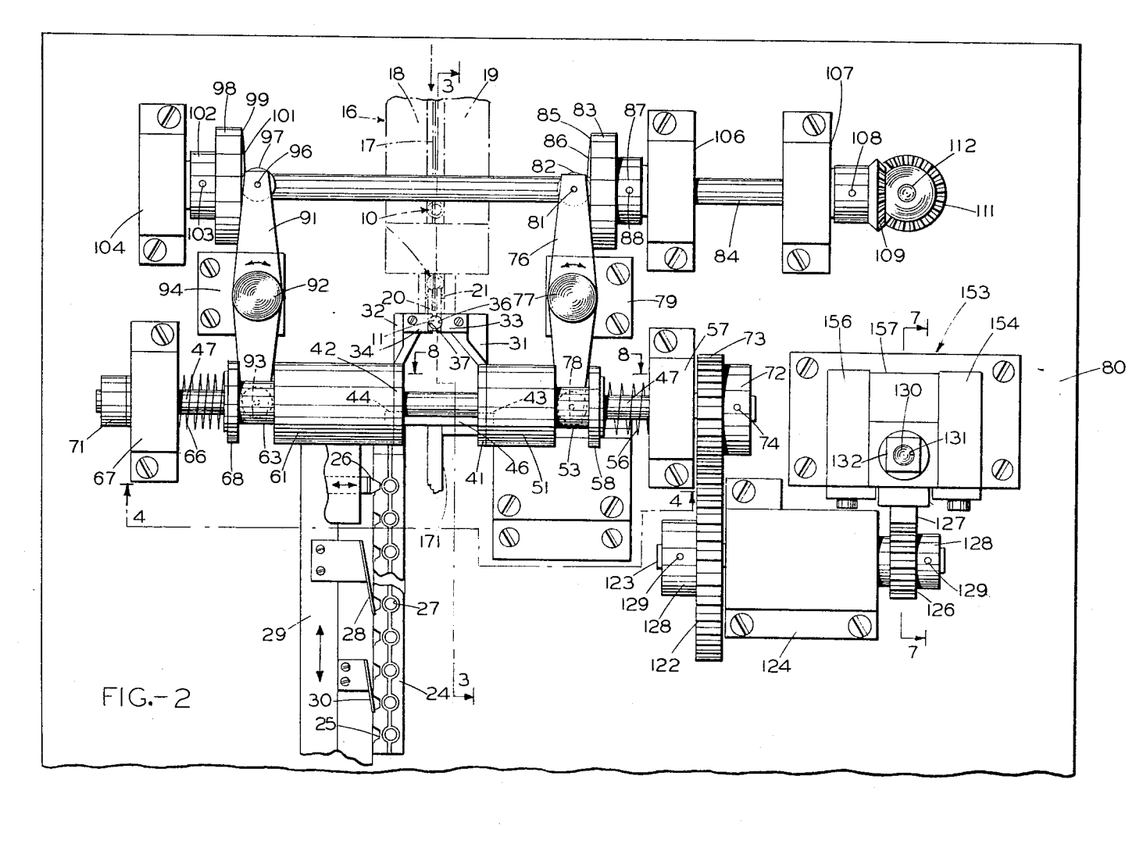
FIG. 2 is a plan view of an apparatus embodying the principles of the present invention, showing a pair of arms having opposed jaws for orienting, gripping and inverting electrical components that are fed along a vibratory track.
Figures 4, 5:
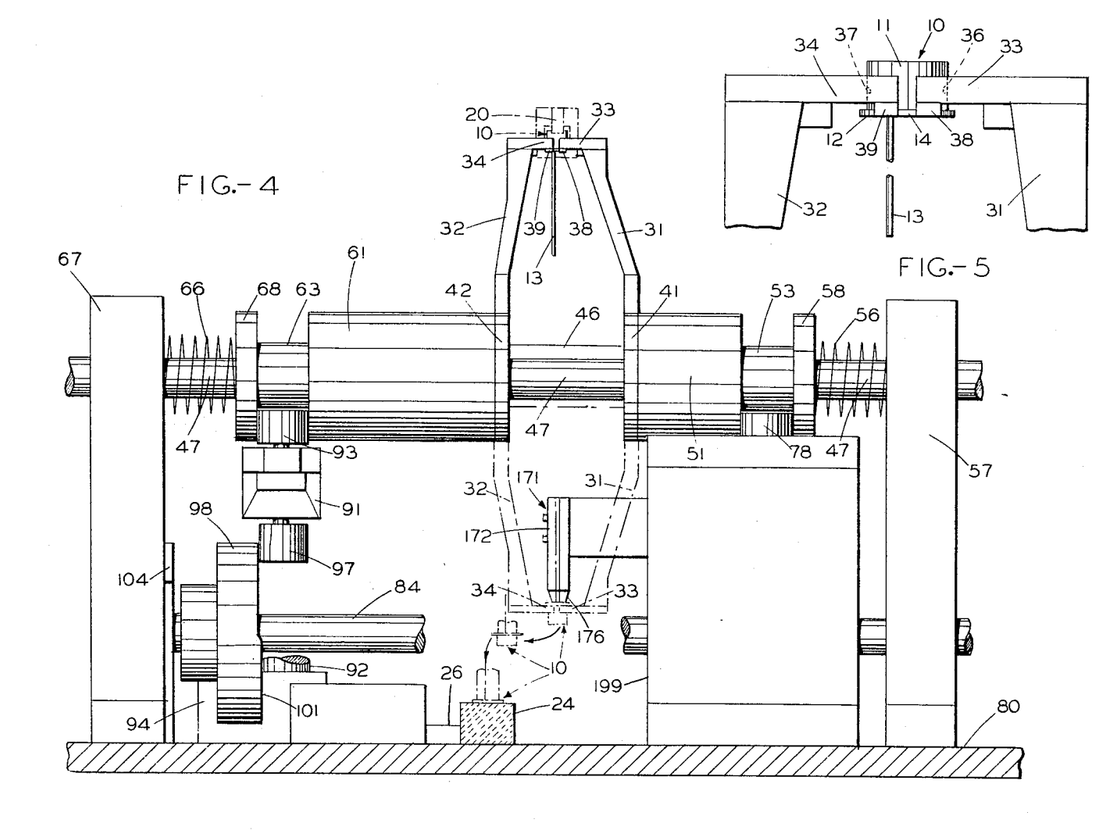
FIG. 4 is an enlarged, fragmentary front view, taken along line 4—4 of FIG. 2 and showing the arms in their upright positions in solid lines and in their downward position in phantom lines, with a vacuum holder located between the arms.
FIG. 5 is an enlarged detail drawing of the jaws in gripping relationship with a component and showing depending cams on the jaws for orienting the tab.

Referring to FIGS. 2-4, the relative positions of the vibratory track 16 and the indexable rack 24 are illustrated. The track 16 is vibrated by any conventional means (not shown) to provide a continuous supply of the components 10 in a row to a rest position at the detent 20. The rack 24 is indexed by any conventional means, such as a pawl 28, mounted on a reciprocating strip 29 to successively align empty nests 27 with the transfer mechanisms. A stationary detent 30 prevents retrograde movement of the rack 24.

A pair of spaced, bowed arms 31 and 32 is provided having opposed jaws 33 and 34, respectively. The jaw 33 has a semicircular recess 36 and the jaw 34 has a similarly shaped recess 37. The jaws 33 and 34 have depending cams or guides 38 and 39 (FIG. 5), respectively, for engaging and orienting the tabs 14 into a forwardly extending direction. The recesses 36 and 37 may be moved into position to surround and grip the head 11 of the leading component 10 on track 16.

The arms 31 and 32 have bottom portions 41 and 42, respectively, which are provided with keyways 43 and 44, respectively, for receiving a key 46 secured to a long shaft 47 extending horizontally across the apparatus as viewed in FIG. 4, and on which the arms are mounted. The lower portion 41 of the arm 31 is fixedly mounted to a collar 51 which is free to slide back and forth on the shaft 47. The collar 51 has a neck portion 53 and is normally urged toward the center line of the track 16 by a spring 56 which is mounted between a bearing support 57 and an end portion 58 of the collar 51. Similarly, the lower portion 42 of the arm 32 is fixedly attached to a collar 61 which is free to slide back and forth on the shaft 47. The collar 61 has a neck portion 63 and is normally urged toward the center line of the track 16 by a spring 66 which is mounted between a bearing 67 and an end portion 68 of the collar 61. The shaft 47 is free to rotate within the bearings 57 and 67 and is held against longitudinal movement by a collar 71 at the left end (FIG. 2) and a hub 72 of a gear 73 which is secured to the right end of the shaft 47 by a set screw 74.

Referring to FIGS. 2 and 3, the right-hand arm 31 is reciprocated along the mounting shaft 47 at desired intervals by a horizontally pivotable lever 76 which is mounted for pivotable movement about a vertical pin 77. One end of the lever 76 has a roller 78 (FIG. 4) which is received in the neck portion 53 of the collar 51 so as to move the arm 31 upon pivoting of the lever 76. The pin 77 is free to rotate in a bearing support 79 which is mounted on a frame 80. Mounted on the other end of the lever 76 by a pin 81 is a follower roller 82. A cam 83 is mounted on an elongated cam shaft 84 and has a camming face 85 against which the follower roller 82 is urged by the action of the spring 56. The cam face 85 has a raised portion 86 for pivoting the lever 76 back and forth on the pin 77. A hub 87 is integral with the cam 83 and is secured to the shaft 84 by a set screw 88 for adjusting the longitudinal position of the cam 83 on the shaft 84.

A similar mounting lever 91 is provided for reciprocating the left jaw 34. This lever 91 is mounted for pivotable movement about a pin 92, one end of the lever 91 having a roller 93 (FIG. 4) which is received in the neck portion 63 of the coller 61. The pin 92 is free to rotate in a bearing support 94 which is mounted on the frame 80. Mounted on the other end of the lever 91 by a pin 96 is a follower roller 97. A cam 98 is mounted on the cam shaft 84 and has a camming face 99 against which the follower roller 97 is urged by the action of the spring 66 associated with the left arm 32. The camming face 99 has a raised portion 101 for pivoting the lever 91 back and forth on the pin 92. A hub 102 is integral with the cam 98 and is secured to the shaft 84 by a set screw 103 for adjusting the longitudinal position of the cam 98 on the shaft 84.

The cam shaft 84 is supported for rotation in a trio of bearings 104, 106 and 107. Secured to an end of the shaft 84 by a set screw 108 is a bevel gear 109 which is designed to rotate the cam shaft 84 to pivot the levers 76 and 91 to open and close the jaws 33 and 34. The gear 109 is in engagement with a second bevel gear 111 which is mounted on a vertical shaft 112. At the other end of the shaft 112 is another bevel gear 113 (FIGS. 3 and 6) which is in engagement with a bevel gear 114 which is secured to a shaft 116.

*Inverting mechanism*

The gear 73 is fixedly secured to the shaft 47 (FIGS. 2 and 6) for rotating the shaft 47 through approximately 180° to rotate the arms 31 and 32 and invert a component 10. The gear 73 is in mesh with a gear 122 which is mounted on a shaft 123 which is supported for rotation in a bearing 124. Secured to the other end of the shaft 123 is a pinion gear 126 which is in mesh with a rack 127, also illustrated in FIG. 7. The gears 122 and 126 are secured against longitudinal movement on the shaft 123 by a pair of hubs 128. The hubs 128 are secured to the shaft 123 by a pair of set screws 129.

Figure 7:
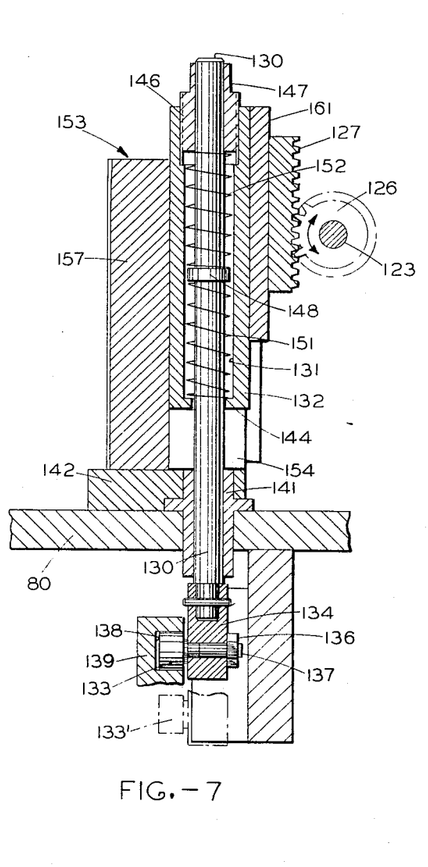
FIG. 7 is a fragmentary, enlarged cross-sectional view taken along line 7—7 of FIG. 2, showing the driving mechanism for rotating the jaws through approximately 180°.
Figures 8, 9, 10, 11:
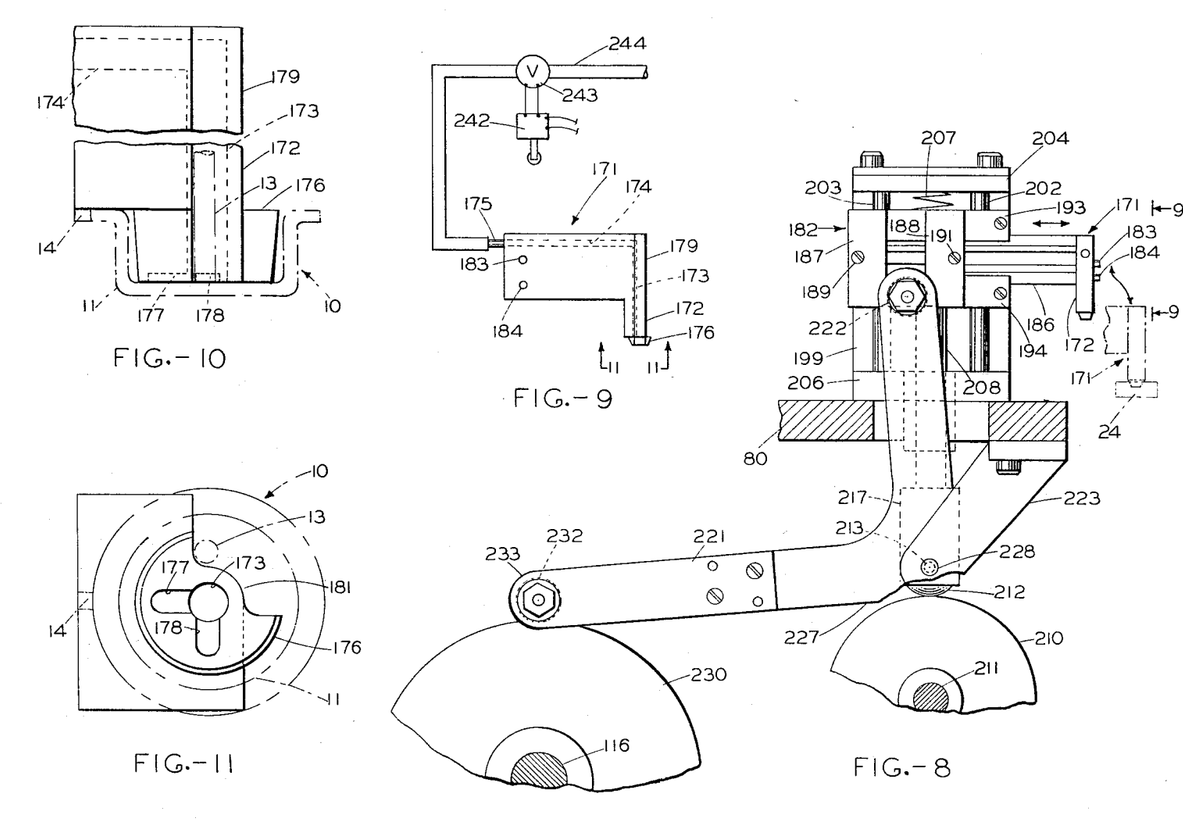
FIG. 8 is an enlarged, fragmentary end view with portions removed, taken along line 8—8 of FIG. 2 and showing the driving mechanism for moving the vacuum holder laterally and downwardly to position a component in the second track.
FIG. 9 is an enlarged, detail side elevation of the vacuum holder, taken along line 9—9 of FIG. 8.
FIG. 10 is a detail drawing of the tip of the vacuum holder shown in FIG. 9, showing a component positioned on the end of the tip in phantom lines.
FIG. 11 is a detail bottom view of the tip of the vacuum holder, taken along line 11—11 of FIG. 9, showing an outwardly extending aperture through which a vacuum is drawn to hold a header in place.

Referring to FIG. 7, there is shown a detail veiw of a mechanism for driving the rack 127 and thus the pinion 126 to effect inversion of the arms 31 and 32 and a component 10. A shaft 130 is mounted for vertical movement in a cylindrical passageway 131 of a block 132 by the action of a follower roller 133 which is secured to a bottom portion 134 of the shaft 130 by a nut 136 and bolt 137. The follower roller 133 is mounted in a groove 138 of an internal groove cam 139 for reciprocating the shaft 130 in a vertical manner. The lowermost position of the follower roller 133 is shown in phantom lines at 133'. The shaft 130 is free to reciprocate through a guide bearing 141 which is supported in a block 142 mounted on the frame 80. The block 132 has an inwardly protruding flange 144 at the bottom thereof and has a threaded section 146 at the upper end thereof for receiving an exteriorly threaded bushing 147 through which the shaft 130 is free to reciprocate.

Fixedly attached to the shaft 130 is a compression ring 148. A first compression spring 151 is mounted between the lower portion of the ring 148 and the inwardly protruding flange 144. A second compression spring 152 is mounted between the upper portion of the ring 148 and the bushing 147. A bifurcated support 153 (FIG. 2) is provided having furcations 154 and 156 and an upstanding base 157 between which the block 132 is free to slide. Mounted on a side of the block 132 is a plate 161 to which is fixedly attached the rack 127.

Rotation of the cam 139 causes the follower roller 138 and the shaft 130 to reciprocate in a vertical manner. As the shaft 130 moves downwardly, the lower portion of the ring 148 urges the block 132, the plate 161 and the rack 127 downwardly under the action of the spring 151. This movement causes the pinion 126 and the gear 122 to rotate in a counterclockwise direction. Thus, the gear 73 is rotated in a clockwise direction (FIGS. 3 and 6) which oscillates the arms 31 and 32 through approximately 180° to invert a component 10 which is grasped between the jaws 33 and 34. Subsequently, the cam 139 urges the follower roller 133 in an upward direction to reverse the direction of motion of the rack 127 by the action of the spring 152. This causes the pinion 126 and the gear 122 to rotate in a clockwise direction which drives the gear 73 in a counterclockwise direction to return the jaws 33 and 34 to their original up position.

A stop 162 (FIG. 3) is positioned so as to engage a section 163 of the arm 31 to insure the arm does not overtravel as it is rotated in the clockwise direction. A similar stop (not shown) may be provided for the arm 32. Likewise, an L-shaped projection 164 which is secured to the arm 31 engages the stop 162 in the counterclockwise direction to prevent overtravel. The arms 31 and 32 are oscillated until the section 163 engages the stop 162. The springs 151 and 152 each compensate for any overtravel of the cam 139 in one direction of movement. The operation of the inverting mechanism is such that the arms 31 and 32 are given positive motion, and the springs 151 and 152 also act to prevent sudden starting or stopping of the movement which is desirable when handling electrical components.

Vacuum holder

Referring to FIGS. 4 and 8-11, there is shown an apparatus including a vacuum chuck or holder 171 for receiving an inverted component 10 from the jaws 33 and 34 and transferring the component laterally and downwardly to position the component in a nest 27 of the receiving rack 24. The holder 171 has a depending section 172 with an aperture 173 (FIGS. 10 and 11) which connects with a transverse aperture 174 and a tube 175 through which a vacuum may be drawn. At the bottom end of the depending section 172 is a tapered tip 176 over which the head 11 of a component may be fitted, as illustrated in phantom lines in FIG. 10. At the bottom of the depending section 172, the aperture 173 is extended outward at 177 and 178 to provide a greater area for the vacuum to grasp the head 11. Along a vertical face 179 of the holder 171 is a groove or recess 181 having a generally W-shaped cross section (FIG. 11) for receiving the lead 13 of the component 10.

The body of the holder 171 is mounted to a carriage 182 (FIG. 8) by a pair of screws 183 and 184. The carriage 182 includes a slide or tenon 186 on which is mounted a pair of plates 187 and 188 by a pair of set screws 189 and 191, respectively. The tenon 186 forms a dovetail joint with a mortise 192 (FIG. 3) which includes a pair of horizontal plates 193 and 194 which are secured to a guide block 196. The guide block 196 is mounted within the opening of a channel-shaped support 199 and has a pair of apertures 201 into which fit a pair of vertical guide rods 202 and 203. The support 199 is mounted on the frame 80.

The guide rods 202 and 203 are fixedly supported between an upper frame 204 and a lower frame 206 of the channel-shaped support 199, and the guide block 196 is free to reciprocate on the shafts 202 and 203. Mounted between the upper frame 204 and the top of the guide block 196 is a compression spring 207 for normally urging the guide block 196 downwardly. A driving shaft 208 is secured to the bottom of the guide block 196 for controlling the movement of the guide block 196 and the carriage 182 in the vertical plane. A cam 210 (FIGS. 3, 6 and 8) is mounted on a drive shaft 211 and engages a follower roller 212 which is mounted on a pin 213 between a pair of arms 214 and 216 of a yoke 217 secured to the bottom end of the shaft 208.

In order to provide the vacuum holder 171 with horizontal movement, a bent lever 221 is provided having a roller 222 which is mounted between the plates 187 and 188. Mounted on a bracket 223 (FIG. 3) which depends from the frame 80 is an elbow 227 of the lever 221 and which is pivotable on a pin 228 of the bracket 223. A cam 230 is secured to the cam 139 by bolts (not shown) for rotation with the shaft 116. The cam 230 is in driving engagement with a follower roller 232 which is mounted on an end 233 of the lever 221.

The timing of the rotation of the cams 210 and 230 is such that, when the jaws 33 and 34 initially invert and position a lead 13 into the W-shaped groove 181, the cam 210 allows the carriage 182 to move downwardly under the urging of the spring 207 to position the tapered tip 176 into the opening of the head 11 of a stationary, inverted component 10. At this time a cam 241 (FIGS. 3 and 6) actuates a limit switch 242 which operates an electrically operated valve 243 (FIG. 9) for connecting a vacuum line 244 to the tube 175 to cause suction at the tip of the aperture 173. Thus, while the jaws 33 and 34 are still in grasping engagement with the component 10, the vacuum holder 171 (FIG. 4) which is now positioned between the arms 31 and 32 is effective to grasp and maintain the component 10 in an oriented manner. At this time the jaws 33 and 34 are opened and start to return to their upright position. Then, the cam 230 begins to oscillate the L-shaped lever 221 in a clockwise direction (FIG. 8) about the pivot pin 228 to apply horizontal or translating motion to the carriage 182 and the vacuum holder 171. Simultaneously therewith, the cam 211 allows the follower roller 212, the shaft 208 and the entire carriage 182 and guide block 196 to move downwardly under the urging of the spring 207. Thus, the grasped and oriented component 10 is moved laterally and downwardly until the component 10 is positioned in a nest 27 of the rack 24.

Drive mechanism

Figure 6:
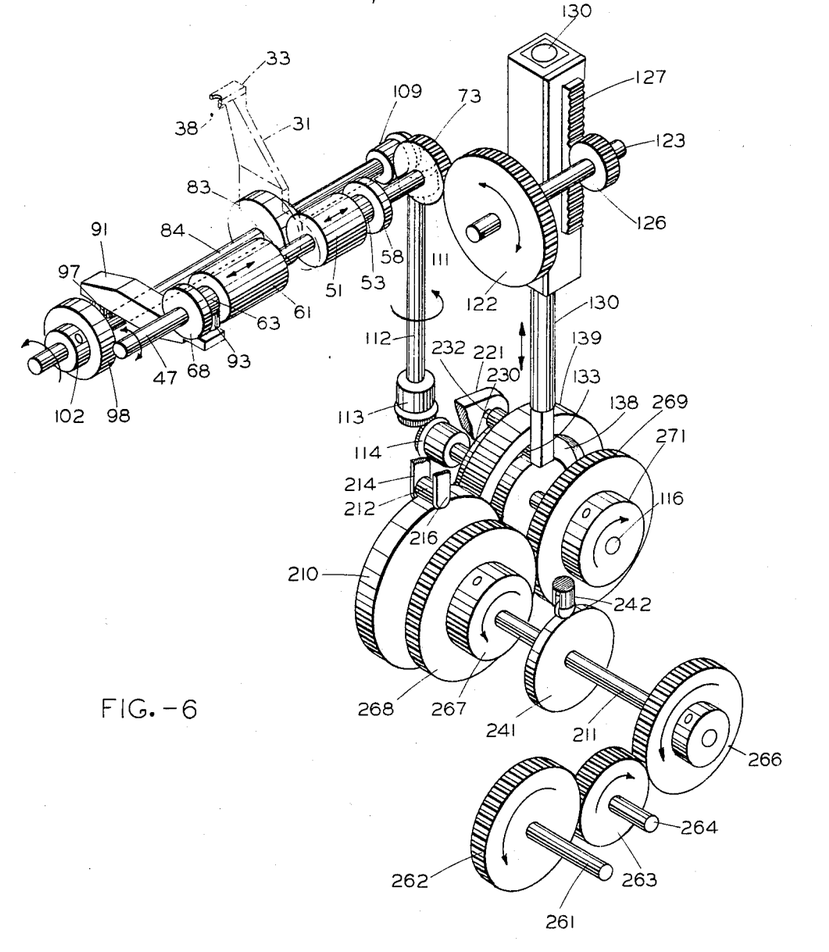
FIG. 6 is a schematic perspective drawing of the driving mechanisms for effectuating the closing of the jaws, the inversion of the arms, and movement of the vacuum holder.

Referring to FIG. 6, there is shown a schematic drawing of the drive layout and the mechanisms actuated thereby. A machine drive shaft 261 is provided having a driving gear 262 mounted thereon which is in engagement with an idler gear 263 mounted on a shaft 264. The idler gear 263 is in mesh with a gear 266 which is mounted on the shaft 211 for rotating the cam 241 which actuates the limit switch 242 for controlling the vacuum drawn through the vacuum holder 171. Rotation of the shaft 211 also rotates the cam 210 which drives the follower roller 212 and the yoke 217 for controlling the vertical movement of the vacuum holder 171.

Also mounted on the shaft 211 by a hub 267 is a gear 268 which is in mesh with a gear 269 which is mounted on the shaft 116 by a hub 271. The gear 269 is effective to drive the shaft 116 and the internal groove cam 139 and the cam 230 which are mounted thereon. The internal groove cam 139 is rotated to reciprocate the shaft 130 for driving the rack 127, pinion 126 and the gears 122 and 73 for rotating the arms 31 and 32 to invert a component 10. The cam 230 is effective to pivot the lever 221 back and forth to control the transverse movement of the vacuum holder 171. Rotation of the shaft 116 also effects rotation of the bevel gear 114 which is mounted thereon which, in turn, rotates the bevel gears 113, 111 and 109. Rotation of the bevel gear 109 causes the shaft 84 to rotate which rotates the cams 83 and 98 and pivots the lever 76 (FIG. 2) and the lever 91 for reciprocating the collars 51 and 61 on the shaft 47. Reciprocation of the collars 51 and 61, in turn, causes the arms 31 and 32 to be moved toward each other to grip a component 10 and subsequently apart from each other to release the component 10.

Thus, as the shaft 261 and the gear 262 are continuously rotated, the jaws 33 and 34 are intermittently opened and closed. Also, the arms 31 and 32 are rotated approximately 180° to invert a component and are then subsequently returned to an upright position to receive another component. While the arms 31 and 32 are returning to an upright position, the cams 210 and 230 are effective first to move the vacuum holder 171 downwardly and to then simultaneously move vacuum holder 171 laterally and downwardly to position a component 10 in the nest 27.

*Operation*

Figure 12:
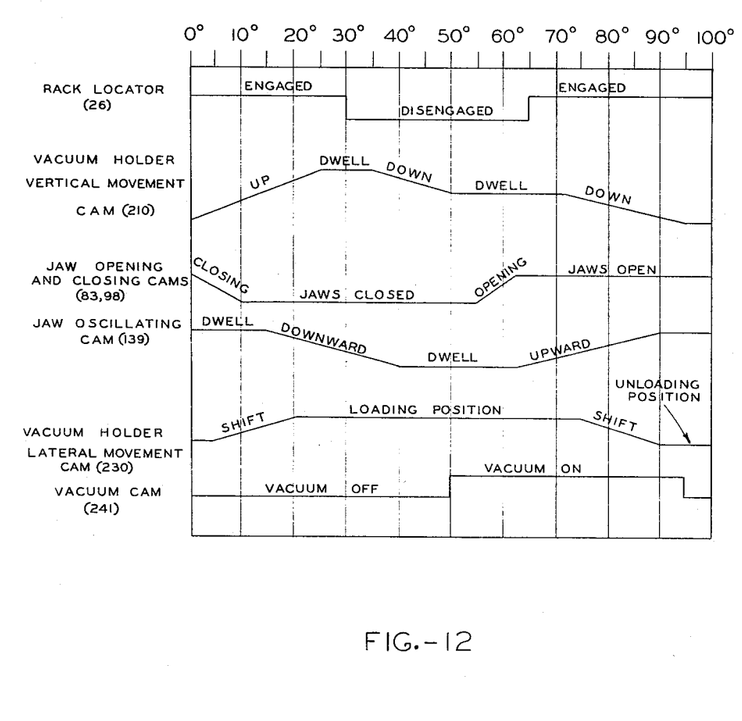
FIG. 12 is a timing chart indicating the timed relationship of operation of the various mechanisms.

Referring to FIGS. 6 and 12, one complete cycle of operation has been designated as 100° and the initial zero position of the machine (i.e., zero on the timing chart of FIG. 12) is when the arms 31 and 32 are in the vertical upright position with the jaws 33 and 34 open. At this point in the cycle, the rack-locating pin 26 is in engagement with the rack 24 and the vacuum holder 171 is at its lowermost position and is shifted to a position over the center line of the rack 24 and is about to commence upward and lateral movement in order to receive a component 10 from the jaws 33 and 34 on their next inversion. Also, at this time the cam 241 is in such a position that no vacuum is being drawn on the vacuum holder 171. The jaws then commence to close on a component 10 which is supplied by the vibratory track 16 to a position beneath the detent 20.

At 15° of the cycle, the jaws have closed around the component 10 and have oriented the tab 14 into a forwardly pointing direction and the arms 31 and 32 are just beginning to be rotated in a clockwise direction.

At 30° of the cycle, the rack locator 26 is moved into a disengaged position so that the rack 24 may be indexed by the pawl 28 to present an empty nest 27. Also, at this time the vacuum holder 171 has reached its uppermost position and has been laterally shifted to a position in line with the center line of the jaws 33 and 34.

At 40° of the cycle, the arms 31 and 32 have been rotated approximately 180° and the component 10 is in an inverted position with the lead 13 aligned in the W-shaped groove 181 of the vacuum holder 171. The vacuum holder 171 has commenced downward movement so as to position the tapered tip 176 in the opening of the head 11 to place the aperture 173 in contact therewith. At this time, the rack locator 26 is still out of engagement with the rack 24, the jaws 33 and 34 are still closed and no vacuum is being drawn through the aperture 173.

At 50° of the cycle, the vacuum holder 171 has been moved to a position wherein the tip 176 is in engagement with the bottom side of the head 11 and the cam 241 actuates the switch 242 to open the valve 243 to pull a partial vacuum through the tube 175 and the apertures 174 and 173. It should be noted that the jaws 33 and 34 are still in a closed position for another 5° to provide an overlap between the time when the vacuum holder 171 is effective to grasp the component 10 and when the jaws 33 and 34 open to release the component 10.

At 65° of the cycle, the jaws 33 and 34 have opened to release the component 10 which is now being held by the partial vacuum being drawn on the tube 175. At this time, the rack locator 26 is moved into engagement with the rack 24 to insure that it is properly positioned for reception of the component 10. Also, the arms 31 and 32 have commenced rotation in a counterclockwise direction in order to return to their upright position for grasping the next component.

At 75° of the cycle, the vacuum holder 171, which is now holding the component 10 in an oriented manner with the tab 14 pointed in a rearward direction, has commenced downward movement and is just commencing to be laterally shifted toward the center line of the rack 24.

At 95° of the cycle, the vacuum holder 171 has again reached its lowermost position and has been laterally moved to a position over the center line of the rack 24. The last movement of the vacuum holder 171 is in a vertical direction to enable the head 11 to be placed in the nest 27 without the possibility of it striking any of the sides of the nest. At this time, the valve 243 is closed to remove the partial vacuum on the tube 175 and allow the component 10 to remain in the nest 27 when the vacuum holder 171 is subsequently moved away therefrom. Also, at this time the arms 31 and 32 have been rotated to an upright position and the jaws 33 and 34 are open for the reception of the next component 10.

The apparatus is now in a position to receive the next component and repeat the above-described cycle of operation.

It is to be understood that the above-described arrangements of apparatus and construction of elemental parts are simply illustrative of an application of the principles of the invention, and many other modifications may be made without departing from the invention.

What is claimed is:

1. Apparatus for transferring an article from one work holder to another in an oriented and inverted position, the article having a projecting portion to be oriented, which apparatus comprises:

a shaft;

a pair of opposed jaws slidably mounted on the shaft for gripping the article therebetween;

means for sliding the jaws on the shaft to grip an article located on a first one of the work holders;

cam means on the jaws for engaging the projecting portion of the article as the jaws close to orient the article in a predetermined manner between the jaws;

means for rotating the shaft to move the jaws as a unit, while closed, to remove the article from the first work holder and invert it;

an auxiliary article holder adjacent to the position of the jaws after inversion of the article for receiving the article from the jaws and maintaining the orientation thereof;

means for mounting the auxiliary holder for vertical and horizontal sliding movement;

means for opening the jaws to release the article to the auxiliary article holder; and means rendered effective upon the auxiliary holder receiving the article for simultaneously, horizontally and vertically moving the auxiliary article holder into aligned relationship with the second work holder to deposit the oriented article on the second work holder.

2. Apparatus for transferring an article from a first work holder to a second work holder which is located below and is laterally spaced from the first, which comprises:
a pair of opposed jaws for gripping the article therebetween;
means for closing the jaws to grip an article located on the first work holder;
means for moving the jaws as a unit, while closed, to remove the article from the first work holder and invert it;
a vacuum chuck for receiving the inverted article from the jaws;
means for mounting the chuck for both vertical and lateral movement;
means for moving the chuck downward against a surface of the article held between the jaws, after inversion of the article;
means for drawing a partial vacuum in the chuck to hold the article against the chuck;
means for opening the jaws after the partial vacuum has been drawn, to release the article from the jaws to the vacuum chuck; and
means for moving the vacuum chuck, with the article held thereagainst, predetermined distances downward and laterally to place the article on the second work holder, after which the vacuum is released to deposit the article on the second work holder.

3. Apparatus as recited in claim 2, wherein:
the mounting means for the vacuum chuck includes a slide mounted for horizontal and vertical reciprocation, said slide having the vacuum chuck secured to one end; and
the moving means for the vacuum chuck includes:
a lever connected to the slide,
a first cam for driving the lever back and forth in a horizontal direction,
a drive shaft mounted for vertical reciprocation and secured to the slide, and
a second cam for moving the drive shaft up and down simultaneously with the back and forth movement imparted by the lever to move the slide in a path laterally and downwardly.

4. Apparatus for transferring electrical components in oriented positions from a first track to a second track having nests for receiving the components and spaced below the first track and the components each having a head portion, a tab extending from the head and at least one lead depending from the head, which apparatus comprises:
a pair of opposed jaws having recesses for receiving and gripping a component head therebetween on the first track, the jaws having depending cams for engaging the component tab;
means for moving the jaws together to grip a component head and to cam the tab into a predetermined orientation between the jaws;
a vacuum chuck positioned beneath the component, the chuck having a groove for receiving a lead and a passageway in communication with one end of the chuck;
means for rotating jaws through an angle of approximately 180° to remove the component from the first track, invert the component and position the component lead in the groove of the chuck;
means for advancing the chuck to position the passageway in contact with a surface of the component;
means for drawing a partial vacuum through the passageway to retain the oriented and inverted component in the chuck;
means for releasing the moving means to transfer the component to the chuck and for returning the jaws to their original positions adjacent the first track; and
means for moving the chuck to a position over a nest of the second track, so that on cessation of the drawing of the partial vacuum the component is transferred to the nest.

5. Apparatus for transferring electrical components in oriented positions from a first horizontal track to a second horizontal track mounted below the first and laterally spaced therefrom, the components each having a head portion, a tab extending from the head and at least one lead depending from the head, the components being initially fed in a row with the heads up along the first track to an end thereof, the second track having a series of spaced nests for receiving the components with the head down, which apparatus comprises:
a pair of spaced, bowed arms having opposed jaws for gripping the heads of the components;
means for moving the arms together to close the jaws, which grip the head of the component at the end of the first track;
a depending cam on each of the jaws, one of which engages the tab as the jaws close to orient the component between the jaws with the tab parallel to the line of advancement of the components along the first track;
means for rotating the arms as a unit, while the jaws are closed, through an angle of approximately 180° to remove the component from the first track and invert it;
a vacuum chuck positioned between the inverted, bowed arms for receiving the inverted component from the jaws and maintaining the orientation thereof;
means for moving the chuck downward against a surface of the component held between the jaws after inversion of the component;
means for drawing a partial vacuum in the chuck to hold the component against the chuck;
means for moving the arms apart to open the jaws, after the partial vacuum has been drawn, to release the component from the jaws to the vacuum chuck; and
means for moving the vacuum chuck, with the component held thereagainst, predetermined distances downward and laterally to place the oriented component in the nest of the second track, after which the vacuum is released to deposit the component head down in the nest.

6. Apparatus as recited in claim 5, wherein said vacuum chuck includes:
a vertical face having a generally W-shaped groove for receiving the lead; and
a tip which is receivable in the head portion of the component and has a passageway through which the partial vacuum is drawn for holding the component in an oriented and inverted position against the tip of the chuck.

7. Apparatus for transferring an article from one work holder to another in an oriented and inverted position, the article having a projecting portion to be oriented, which apparatus comprises:
a horizontal shaft;
a pair of spaced arms slidably mounted on the shaft;
a pair of opposed jaws mounted upon the arms in opposite relationship for gripping the article therebetween;
a pair of collars slidably mounted on the shaft and one collar being connected to each arm, the collars each having a neck portion;
a pair of pivotable levers, one positioned in the neck portion of each collar;
a pair of springs, one in engagement with each collar, for normally urging the arms toward each other and the jaws together into article gripping relationship;
cam means on the jaws for engaging the projecting portion of the article as the jaws close to orient the article in a predetermined manner between the jaws;

means for moving the jaws as a unit, while closed, to remove the article from the first work holder and invert it;

an auxiliary article holder adjacent to the position of the jaws after inversion of the article for receiving the article from the jaws and maintaining the orientation thereof;

cam means in contact with the levers for pivoting the arms apart to open the jaws; and means for moving the auxiliary article holder into aligned relationship with the second work holder to deposit the oriented article on the second work holder.

8. Apparatus for transferring an article from one work holder to a second work holder in an oriented and inverted position, the article having a projecting portion to be oriented, which apparatus comprises:

a pair of opposite jaws for gripping the article therebetween;

means for closing the jaws to grip an article located on a first one of the work holders;

cam means on the jaws for engaging the projecting portion of the article as the jaws close to orient the article in a predetermined manner between the jaws;

means for moving the jaws as a unit, while closed, to remove the article from the first work holder and invert it;

a vacuum chuck adjacent to the position of the jaws after inversion of the article for receiving the article from the jaws and maintaining the orientation thereof;

means for moving the vacuum chuck downwards against a surface of the article held between the jaws;

means for drawing a partial vacuum in the chuck to hold the article against the vacuum chuck;

means for opening the jaws to release the article to the vacuum chuck; and means for moving the vacuum chuck into aligned relationship with the second work holder to deposit the oriented article on the second work holder.

References Cited by the Examiner

UNITED STATES PATENTS

| | | | |
|---|---|---|---|
| 1,368,780 | 2/1921 | Anderson | 214—1 X |
| 1,858,642 | 5/1932 | Ross | 214—147 |
| 2,823,815 | 2/1958 | Doron | 214—91 |
| 2,855,088 | 10/1958 | Moses | 198—20 |
| 2,868,240 | 1/1959 | Roeber | 141—65 |
| 2,915,200 | 12/1959 | Roeber | 214—1 |
| 3,175,673 | 3/1965 | Hagner | 214—1 X |

MARVIN A. CHAMPION, *Primary Examiner.*